(12) United States Patent
Wadsley (10) Patent No.: US 11,765,994 B2
(45) Date of Patent: Sep. 26, 2023

(54) SUPPORT STAND FOR COMBINE FEEDER HOUSE

(71) Applicant: Robert Leslie Wadsley, Linn Grove, IA (US)

(72) Inventor: Robert Leslie Wadsley, Linn Grove, IA (US)

(*) Notice: Subject to any disclaimer, the term of this patent is extended or adjusted under 35 U.S.C. 154(b) by 713 days.

(21) Appl. No.: 16/748,457

(22) Filed: Jan. 21, 2020

(65) Prior Publication Data
US 2020/0229348 A1   Jul. 23, 2020

Related U.S. Application Data

(60) Provisional application No. 62/794,007, filed on Jan. 18, 2019.

(51) Int. Cl.
*B66F 9/18* (2006.01)
*A01D 75/00* (2006.01)
*F16M 11/22* (2006.01)
*B66F 9/06* (2006.01)
*B66F 9/12* (2006.01)

(52) U.S. Cl.
CPC ............. *A01D 75/00* (2013.01); *B66F 9/06* (2013.01); *B66F 9/12* (2013.01); *F16M 11/22* (2013.01)

(58) Field of Classification Search
CPC .... A01D 61/008; A01D 75/004; A01D 75/00; B66F 9/12; B66F 9/18; B66F 9/19; B66F 9/06; F16M 11/22
See application file for complete search history.

(56) References Cited

U.S. PATENT DOCUMENTS

| 3,486,648 | A | | 12/1969 | Wald | |
|---|---|---|---|---|---|
| 4,065,013 | A | * | 12/1977 | Orthman | B66F 9/18 414/785 |
| 4,315,395 | A | * | 2/1982 | Randall | A01D 75/20 280/765.1 |
| 4,538,953 | A | * | 9/1985 | Abramson, Jr. | B66F 9/18 414/785 |
| 4,708,576 | A | | 11/1987 | Conley | |
| 4,838,752 | A | | 6/1989 | Bryant | |
| 8,454,295 | B2 | * | 6/2013 | Balcom | B66F 9/12 414/607 |
| 9,371,685 | B2 | * | 6/2016 | Cooper | E06B 7/28 |
| 11,130,661 | B2 | * | 9/2021 | Currie | A01D 87/127 |
| 2003/0091419 | A1 | | 5/2003 | Haas | |

(Continued)

FOREIGN PATENT DOCUMENTS

CA  2544148 A1  10/2007

*Primary Examiner* — Brian E Glessner
*Assistant Examiner* — Daniel J Kenny
(74) *Attorney, Agent, or Firm* — McKee, Voorhees & Sease, PLC (57) ABSTRACT

A support stand is used for removing, repairing, storing, and reattaching a feeder house from an agricultural combine. The stand is adapted to be raised and lowered with a forklift to position the stand adjacent to the feeder house during removal and to position the feeder house on the combine during reattachment. The stand includes a base, the base having a flat lower surface, the base being adapted to receive a lifting mechanism. An upright frame is mounted at a first end of the base, the upright frame being adapted to selectively attach to a feeder house on a combine when raised by the forklift into alignment with the feeder house.

9 Claims, 10 Drawing Sheets

(56) References Cited

U.S. PATENT DOCUMENTS

| | | | |
|---|---|---|---|
| 2004/0150148 A1* | 8/2004 | Luca | B62D 65/18 |
| | | | 269/17 |
| 2004/0208734 A1 | 10/2004 | Shoemyer et al. | |
| 2007/0289888 A1* | 12/2007 | Stangel | B66F 9/12 |
| | | | 206/430 |
| 2011/0064550 A1 | 3/2011 | Genter et al. | |
| 2012/0107040 A1 | 5/2012 | Genter et al. | |
| 2013/0174529 A1* | 7/2013 | Hyronimus | A01D 34/8355 |
| | | | 403/103 |
| 2016/0114971 A1 | 4/2016 | Genter et al. | |

\* cited by examiner

SUPPORT STAND FOR COMBINE FEEDER HOUSE

CROSS REFERENCE TO RELATED APPLICATION

This application claims priority under 35 U.S.C § 119 to provisional application Ser. No. 62/794,007 filed Jan. 18, 2019 the entire contents of which are hereby incorporated by reference.

FIELD OF THE INVENTION

The invention relates generally to maintenance and storage equipment for agricultural implements, and more specifically to a support stand for removing, supporting, and reattaching a combine feeder house.

BACKGROUND OF THE INVENTION

A feeder house is used to convey material from a harvesting header (sometimes referred to as a harvesting head) to a combine. Accordingly, the feeder house sits between the grain header and the combine when in use. Various types of headers may be attached and removed from the feeder house. Occasionally it is desirable to remove the feeder house from the combine for repair, maintenance, or storage. The conventional mechanism for removing a feeder house involves using a lifting device, such as a forklift, a hoist, or a frontend loader and chains. To work on the removed feeder house, the feeder house is left on the lifting device, or transferred onto block or a safety stand. Reattachment of the feeder house is also accomplished by using the same lifting device and chains. This is an awkward, time-consuming, and dangerous process.

Accordingly, there is a need for an improved mechanism for removing, supporting, and reattaching a combine feeder house.

SUMMARY OF THE INVENTION

Therefore, it is a primary object, feature, and/or advantage of the invention to improve on and/or overcome the deficiencies in the art.

According to one embodiment, the present invention is a feeder house support stand. The support stand includes a base portion adapted to rest on a flat surface such as a floor or the ground and an upright frame extending upwardly from the base portion. The upright frame includes a cross member at an upper portion of the upright frame adapted to engage a flange on the feeder house. A lower portion of the upright frame includes a pair of upright posts that support limit members. The limit members may be threaded members. The limit members are positioned to support a feeder house in a cantilevered position between the cross member and the limit members. The base may be adapted to receive tines of a lifting device, such as a forklift. A latching member may be provided on the support stand to be engaged by a latching mechanism of the feeder house to further secure the feeder house to the stand.

According to another embodiment a method for removing a feeder house from a combine and supporting the combine in a position where it is convenient to perform work on the feeder house, includes providing a stand, wherein the stand includes:
a base, with a flat lower surface. The base is adapted to receive a lifting mechanism; An upright frame is mounted at a first end of the base. The upright frame is adapted to selectively attach to a feeder house on a combine when raised by the lifting mechanism into alignment with the feeder house. The lifting mechanism can move the feeder house attached to the upright frame to a desired location and lower the base until its flat lower surface rests on a support surface such as a floor or the ground. With the lower surface resting on the support surface the stand supports the attached feeder house in a secure configuration above the ground. The method further includes providing a lifting device that includes a lifting mechanism. The lifting device is positioned with the lifting mechanism in engagement received within the base and supporting the stand on the lifting device by raising the lifting mechanism. The upright frame member is then positioned adjacent to and into alignment with the feeder house by moving the lifting device supporting the stand. The feeder house is lifted off of the combine by raising the lifting mechanism to bring the adjacent aligned upright frame member into engagement with the feeder house. The lifted feeder house is moved by moving the lifting device away from the combine. The feeder house is then lowered by lowering the lifting mechanism until the base is supported on the ground after moving the lifted feeder house away from the combine.

These and/or other objects, features, and advantages of the invention will be apparent to those skilled in the art. The invention is not to be limited to or by these objects, features and advantages. No single embodiment need provide each and every object, feature, or advantage.

DETAILED DESCRIPTION

Shown generally in the figures is a support stand 10 that is used for removing, repairing, storing, and reattaching a feeder house 100 from an agricultural combine 5. The stand 10 is adapted to be raised and lowered with a forklift 200 to position the stand 10 adjacent to the feeder house 100 during removal and to position the feeder house 100 on the combine 5 during reattachment. Once the feeder house 100 is attached to the stand 10, the combination can be moved by a forklift 200 to any convenient location. The stand 10 can be set on the ground or a floor and will support the feeder house 100 so that it can be worked on safely for repair or maintenance. After the repair or maintenance, the stand 10 can be used to conveniently and safely reattach the feeder house 100 to the combine. Alternatively, the combination can be moved to a desired location for storage.

Figure 1:
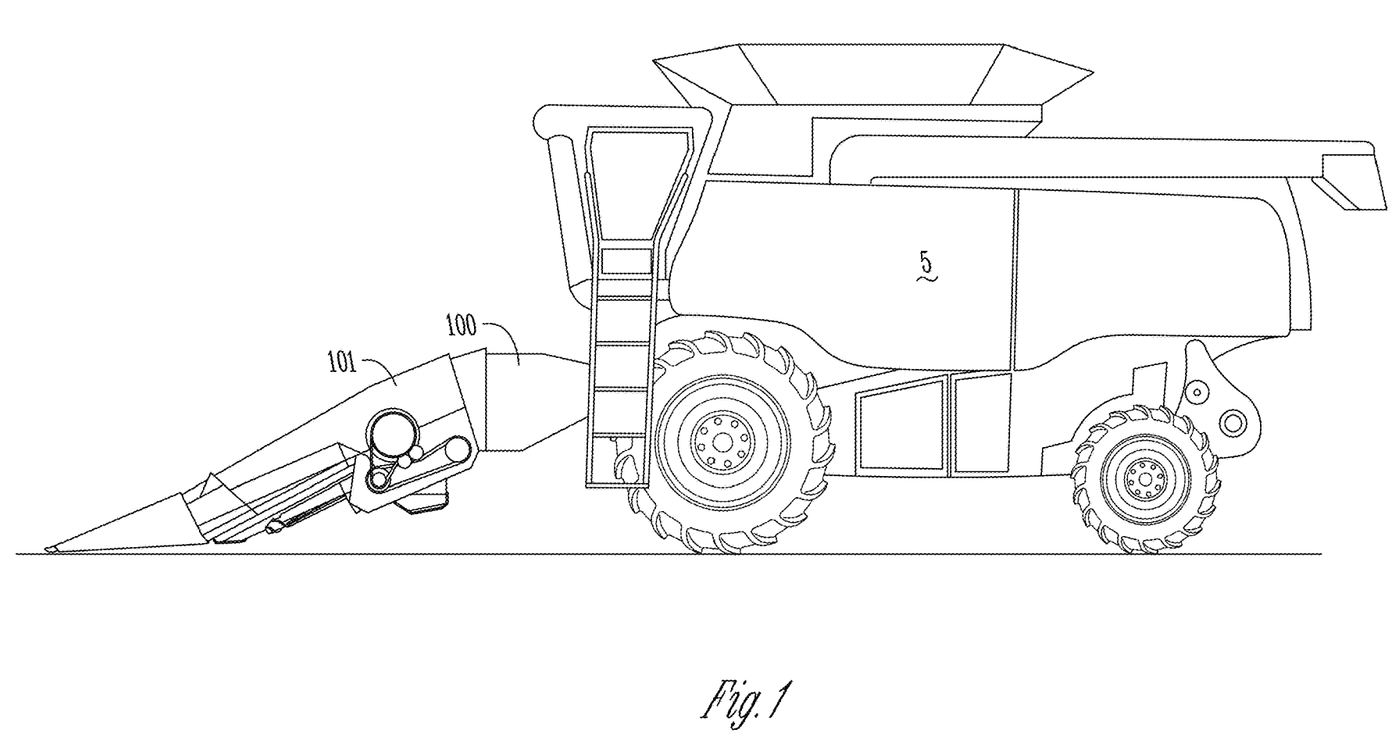
FIG. 1 is a side elevation view of a combine with a picker head attached to a feeder house.
Figure 2:
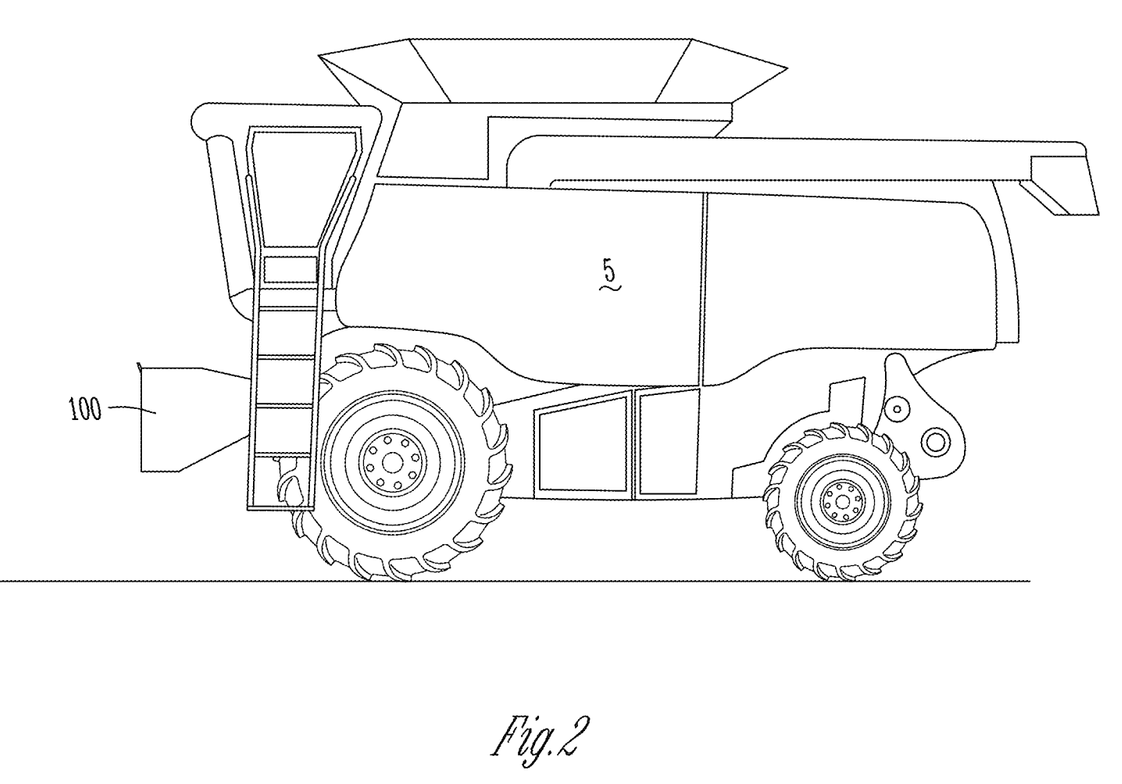
FIG. 2 is a side elevation view of the combine of FIG. 1 with the picker head removed from the feeder house.
Figure 3:
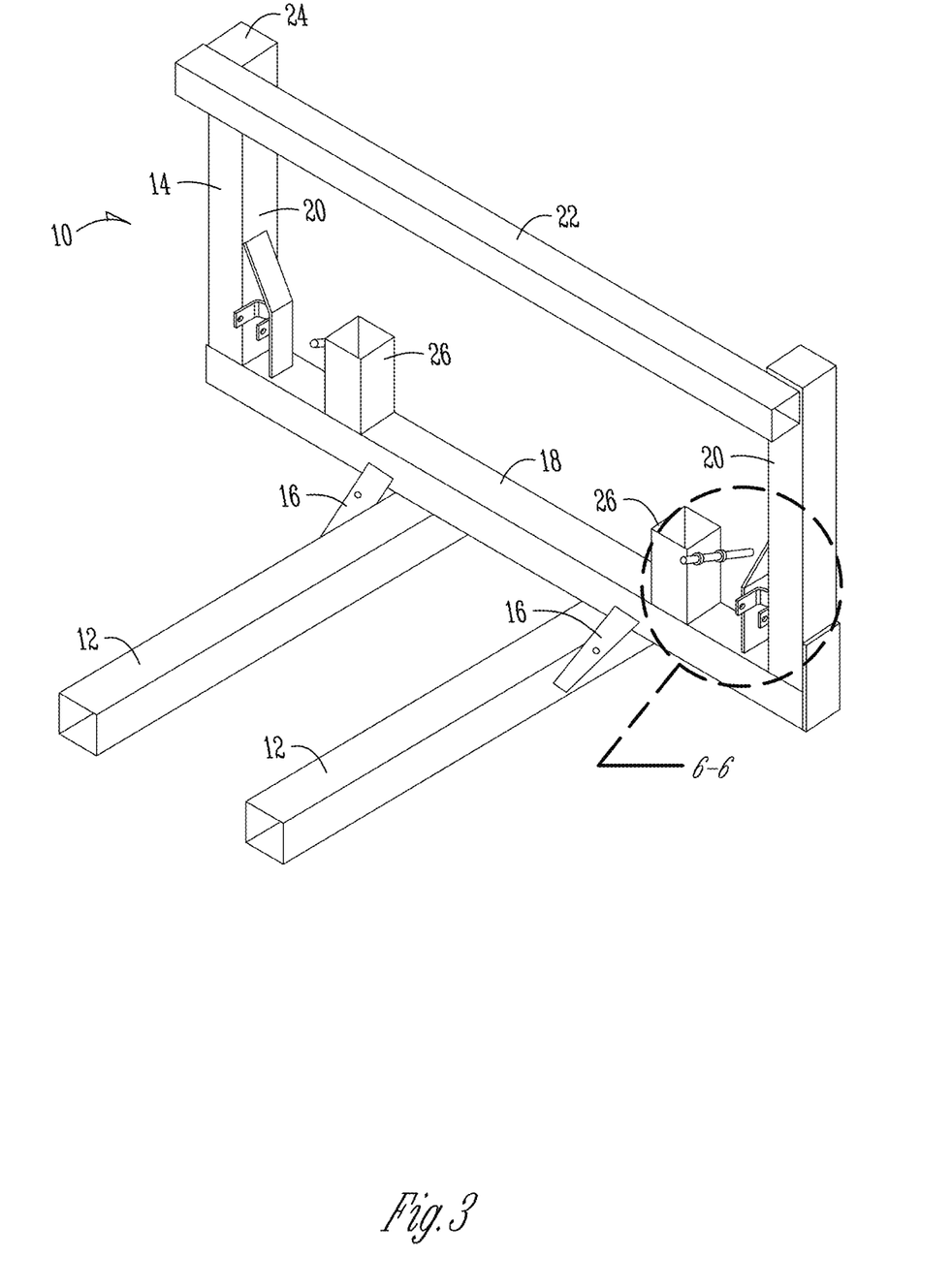
FIG. 3 is an isometric view of a support stand for a combine feeder house according to one embodiment of the present invention.

FIG. 3 is an isometric view of a support stand 10 according to one embodiment that includes features of the present invention. The stand 10 has a base that includes fork tubes 12. The base should be long enough and flat enough to support the combination of the stand 10 and the feeder house 100 on level ground or a floor. The fork tubes may be made of, for example, five-inch square steel tubes that are approximately sixty (60) inches long. The tubes 12 are spaced apart (typically thirty-six (36) inches at the outside edges (see FIG. 3)) and generally parallel with each other and open at least one end to receive the tines of a forklift 200.

An upright frame 14 is attached at one end of the base. In the embodiment shown the upright frame 14 is welded to the tubes 12. Braces 16 may be used to provide additional strength and stability to the connection between the tubes 12 and the upright frame 14. In the shown embodiment, the upright frame 12 comprises a lower horizontal member 18, two upright members 20, and an upper horizontal member 22. The various members 18, 20, and 22 may be formed from square steel tubes. According to the shown embodiment, the lower horizontal member 18 and the upright members 20 are 6-inch square tubes and the upper horizontal member 22 is a 5-inch square tube. Other dimensions may be used. The tubes 18, 20, 22 may be welded together in a generally rectangular shape. In the embodiment shown, the upright members 20 sit directly on top of the lower horizontal member 18 at opposite ends of the lower horizontal member 18. The upper horizontal member is attached to the upright members 20 near the top of the upright members 20 on a front face of the upright members 20 (i.e., the same side of the upright members 20 as the fork tubes 12 extend). The upright members 20 may be provided with caps 24 to prevent dirt, debris, and other material falling into the tubes.

Figure 4:
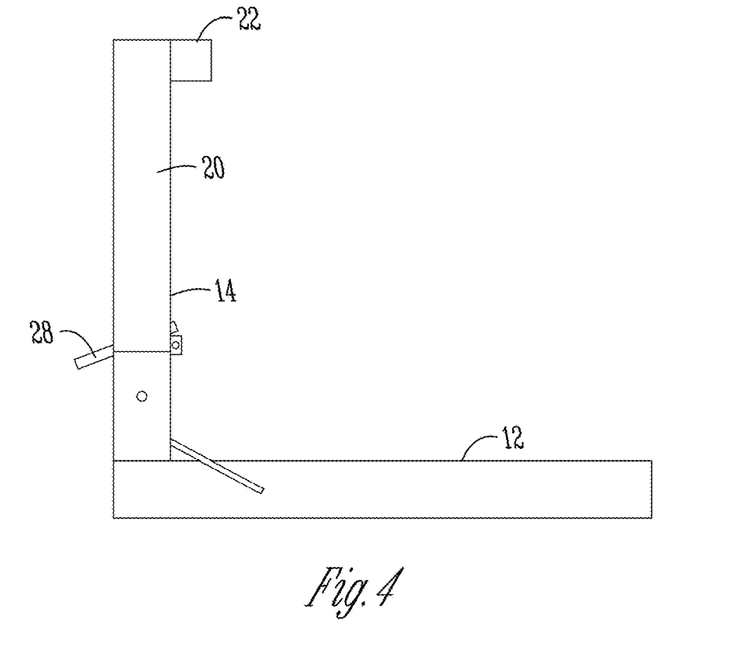
FIG. 4 is a side elevation view of the support stand of FIG. 3.
Figure 5:
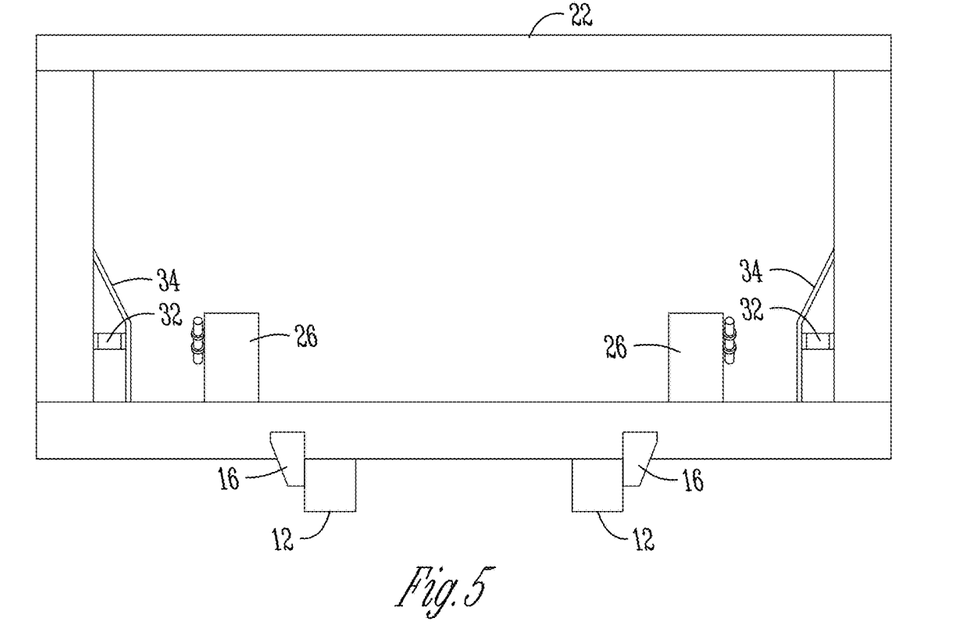
FIG. 5 is a front elevation view of the support stand of FIG. 3.
Figure 6:
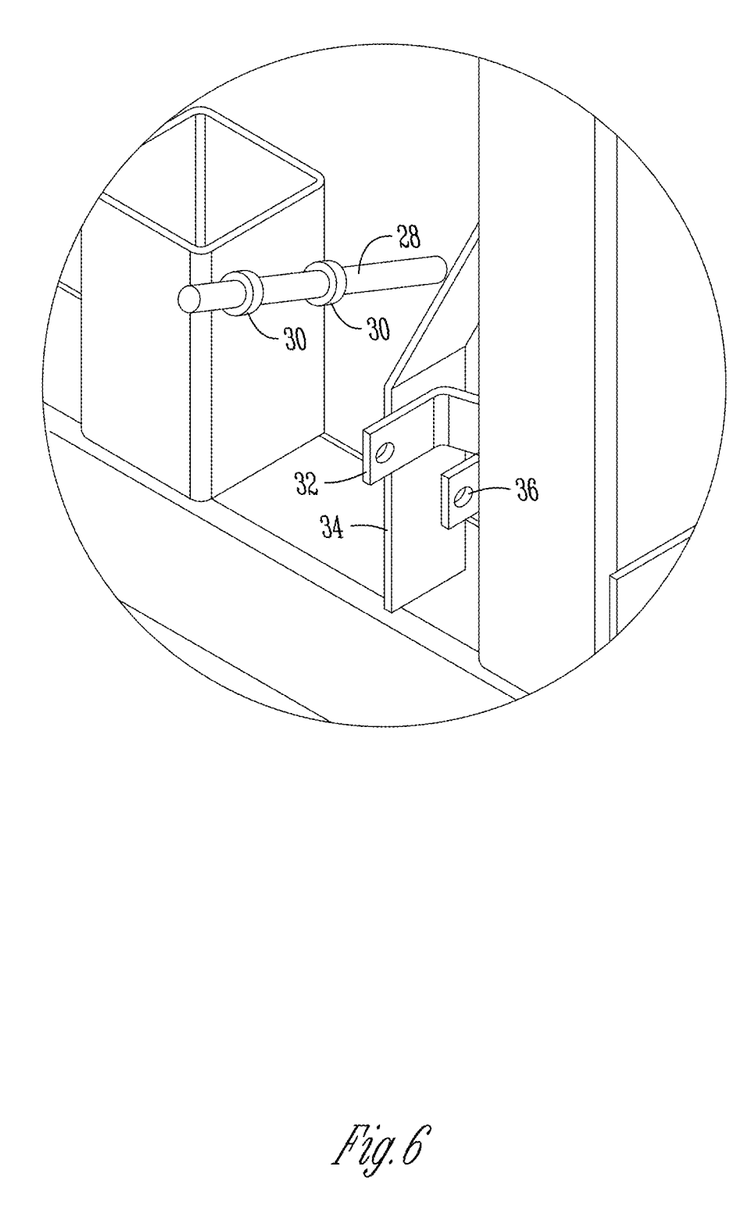
FIG. 6 is an enlarged detail view of the portion of the support stand within circle 6-6 of FIG. 3.

A pair of upright posts 26 or spuds are provided that extend upwardly from the lower horizontal member 22. In the embodiment shown, the posts 26 are made of 6-inch square steel tubes and are attached to the lower horizontal member 18 by weldments (not shown). Optionally caps (not shown) may be provided on the top of the posts 26 to prevent debris from falling into the posts 26, but the caps may be omitted because the posts 26 are shallow enough to permit removal of any items that fall in. The posts 26 are used to attach limit members 28 that push against the feeder house 100 to limit or control the location of the feeder house 100 when it is mounted on the stand 10. In the embodiment shown the limit members 28 are threaded members, for example bolts or lengths of allthread. In the embodiment shown one-inch allthread is used. Two hex nuts 30 are mounted, for example by welding, to the outside face of each upright post 26 to receive the limit members 28 and permit rotational adjustment of the limit members 28. The hex nuts 30 are mounted at different heights on the posts 26 and rotated at an angle relative horizontal so that the threaded members 28 are angled upward toward the front face (i.e., the same side of as the fork tubes 12 extend). As best seen in FIG. 4, in the embodiment shown, the nuts 30 are mounted to provide an upward angle of about sixty-nine degrees (69°) relative to vertical (i.e., twenty-one degrees (21°) relative to horizontal).

Figure 12:
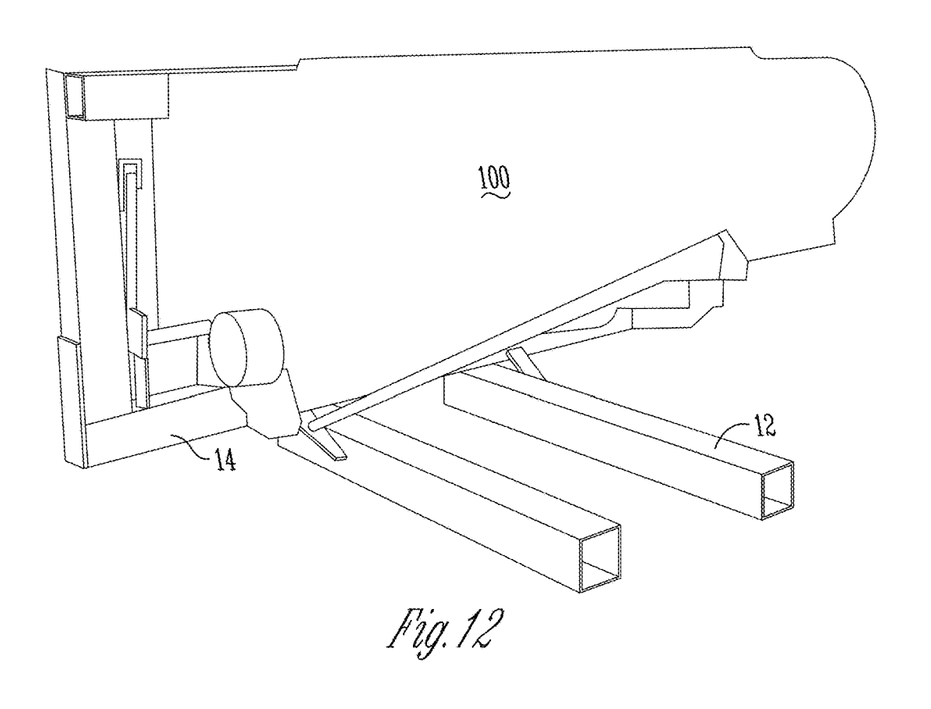
FIG. 12 is a perspective view of the feeder house and support stand of FIG. 10.
Figure 13:
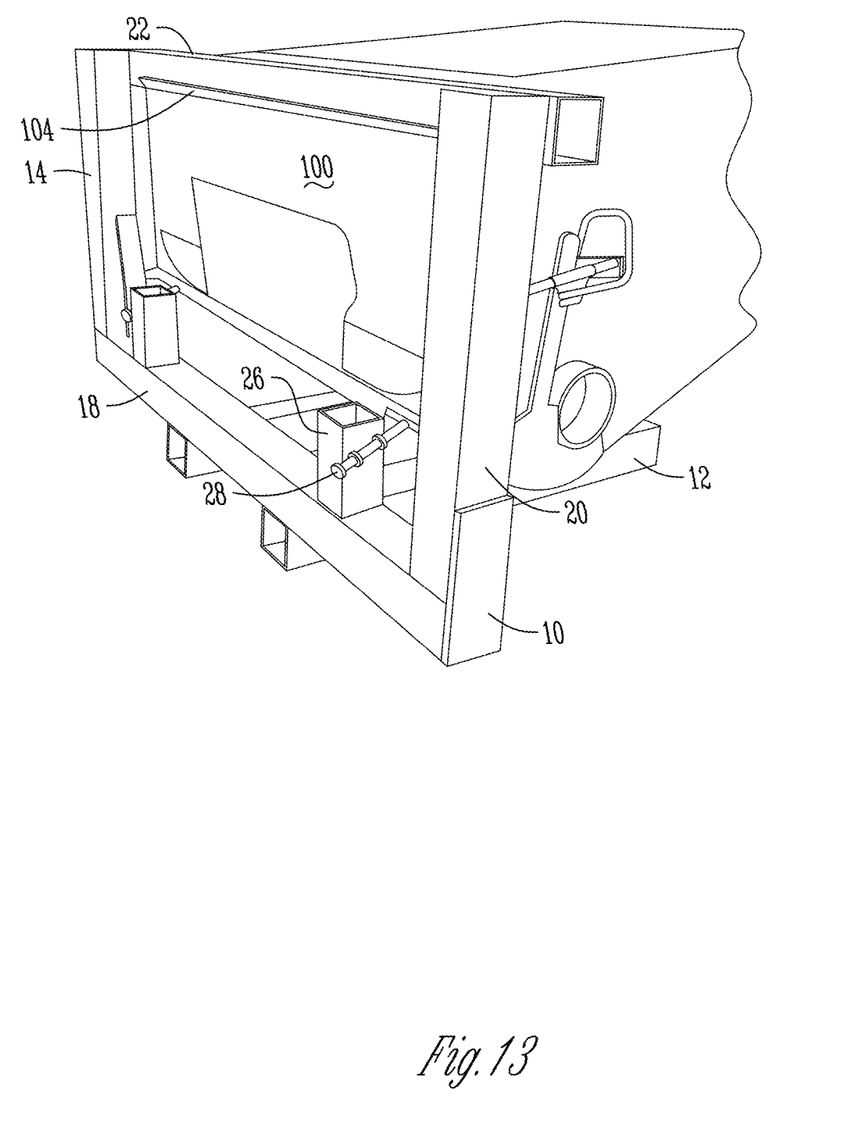
FIG. 13 is another perspective view of the feeder house and support stand of FIG. 10.

Latch brackets 32 are provided on an inner face of each upright member 20. Angle braces 34 are mounted between to the upright members 20 and the lower horizonal member 18 to provide support for the latch brackets 32. In the embodiment shown, the latch brackets 32 are U-shaped and have legs that extend forwardly (same side as fork tubes 12) from the upright members 20. Each of the legs of the latch brackets 32 have holes 36 that receive a latch member 38 (not shown in FIGS. 1-4, see FIG. 12). The latch member 38 may be a bolt or other rigid member. In use, the latch member 38 will be captured by a hook on the feeder house latching mechanism to secure the feeder house 100 to the stand 10 (see FIG. 12).

Figure 7:
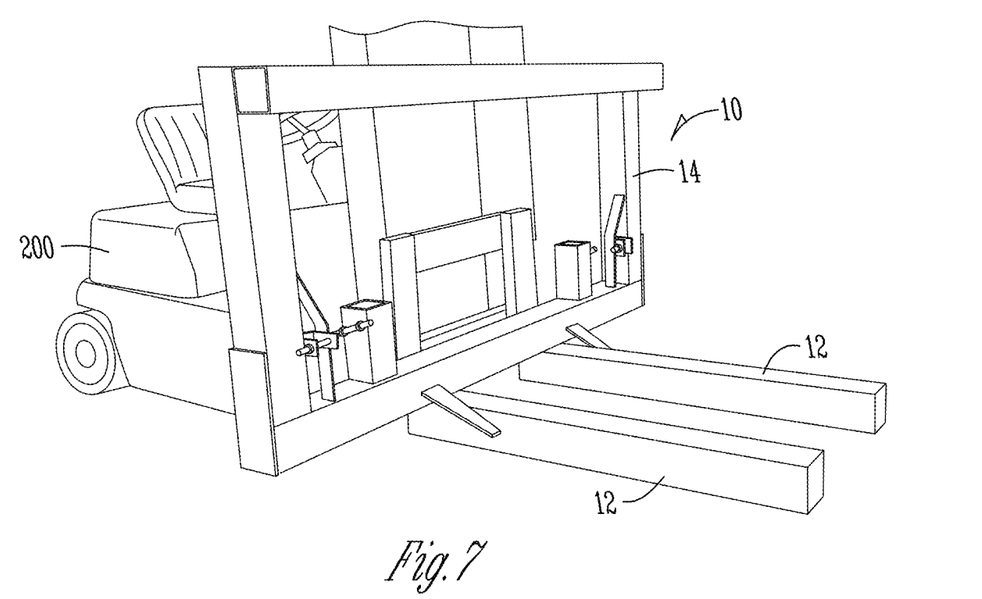
FIG. 7 is a perspective view of a support stand according to one embodiment the present invention on a forklift ready for connecting to a feeder house.

FIG. 7 shows a stand 10 on a forklift 200 ready to be moved to a combine to have a feeder house 100 attached. The tines of the forklift 200 are inserted into the fork tubes 12 of the stand 10 to lift the stand 10 off the ground.

Figure 8:
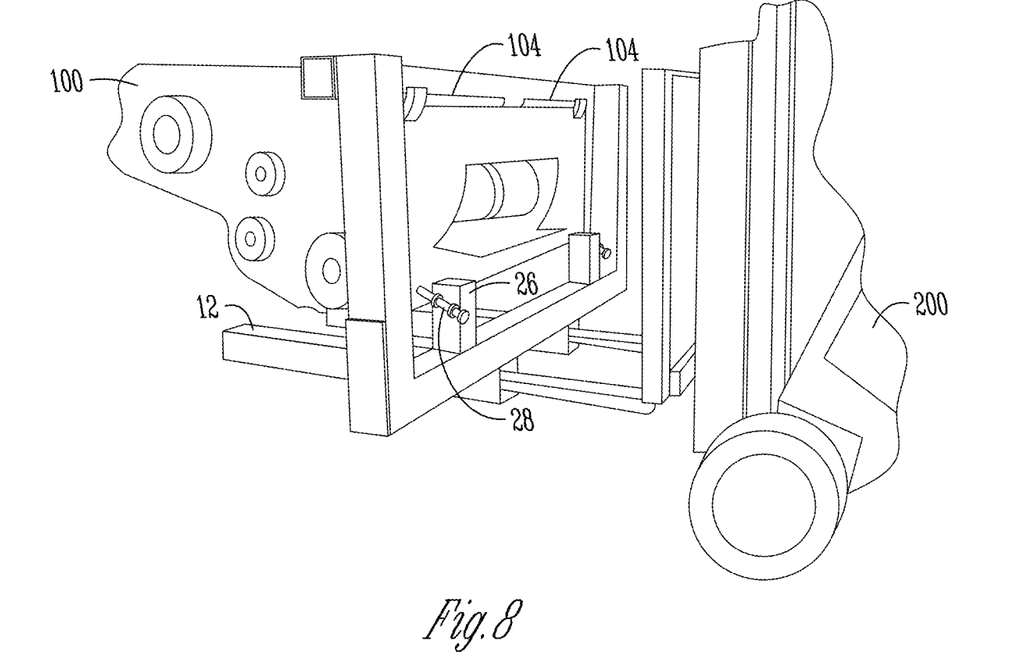
FIG. 8 is a perspective view of a forklift connecting to a feeder house on a support stand according to one embodiment of the present invention.
Figure 14:
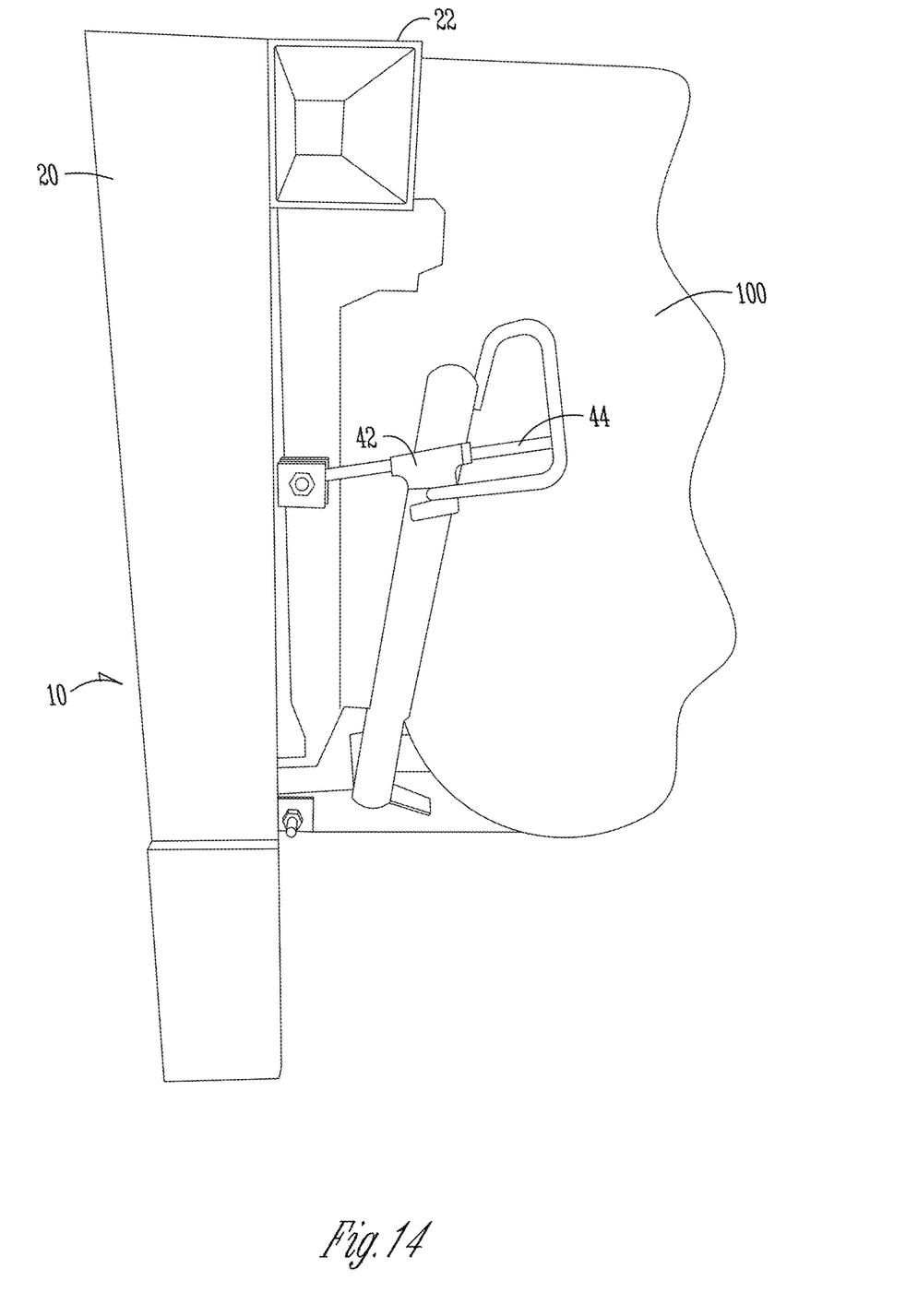
FIG. 14 is a side elevation view of the feeder house and support stand of FIG. 10.

The attachment of the feeder house 100 to the stand 10 is best understood with reference to FIGS. 8 and 14. The stand 10 is brought into alignment with the feeder house 10 on a combine using a forklift 200. The forklift 200 raises the stand 10 so that the upper horizontal member 22 clears the top flange(s) 104 of the feeder house 100. The stand 10 is then moved toward the feeder house 100 until the upper horizontal member 22 is above the front portion of the feeder house 100 just past the flange(s) 104 so that the flange(s) 104 extend(s) to the back side of the upper horizontal member 22. The stand 10 is then lowered until the bottom face of the upper horizontal member 22 contacts the top of the feeder house 100. The limit members 28 contact the face of the feeder house 100 to hold the feeder house 100 at the proper angle for the horizontal member 22 to be in full contact with the flanges 104. The feeder house 100 should thereby be captured in a cantilever fashion between the upper horizontal member 20 and the limit members 28. The latch mechanism of the feeder house 100 that is used to attach the feeder house 100 to a grain head should be aligned with the latch member 38 of the stand 10. The latch member 38 holds the feeder house 100 so that the flanges 104 and horizontal member 22 are in full contact of with each other thus securing the feeder house 100 in a mechanical capture. Typically, this latch mechanism will include a hook 48 that should extend over and around the latch member 38. As best seen in FIG. 14, the latch mechanism will also include a latch handle that is used to adjust the hook 48 against the latch member 38 to thereby pull feeder house against the limit members 28. A latch limit structure that includes a catch 42 and an adjustment rod 44 is shown in FIG. 14. The catch 42 catches the handle of the latching mechanism of the feeder house 100 to retain the latching handle in the proper latched position. The adjustment rod 44 may include a threaded portion to permit positioning of the catch 42 in a desired location depending on the particular geometry of the latching handle.

Figure 9:
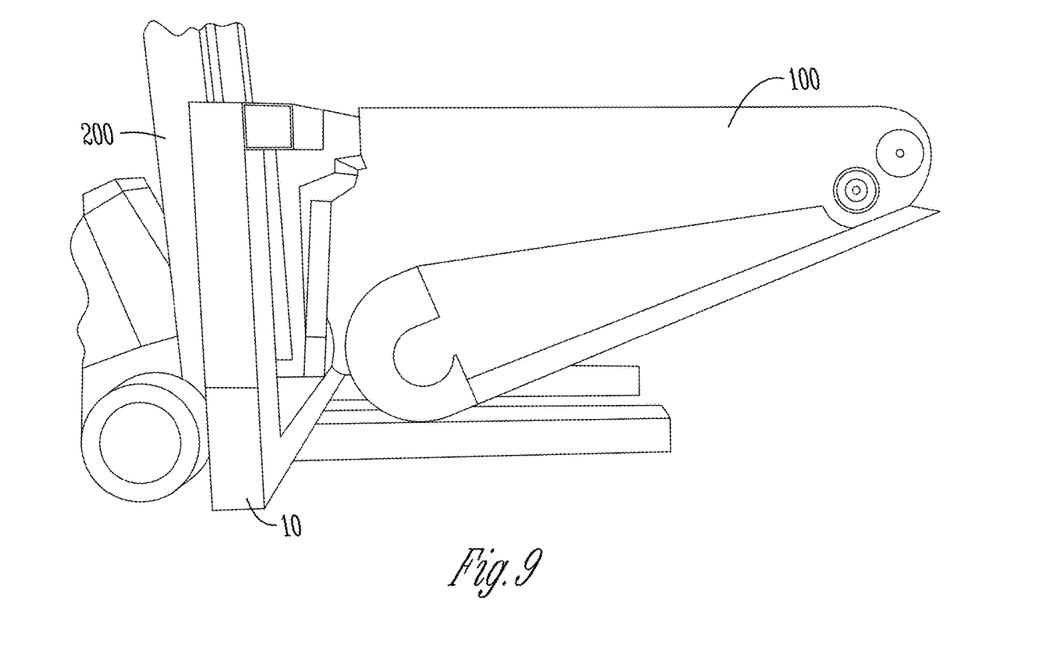
FIG. 9 is a perspective view of a forklift connected to a support stand supporting a feeder house.
Figure 10:
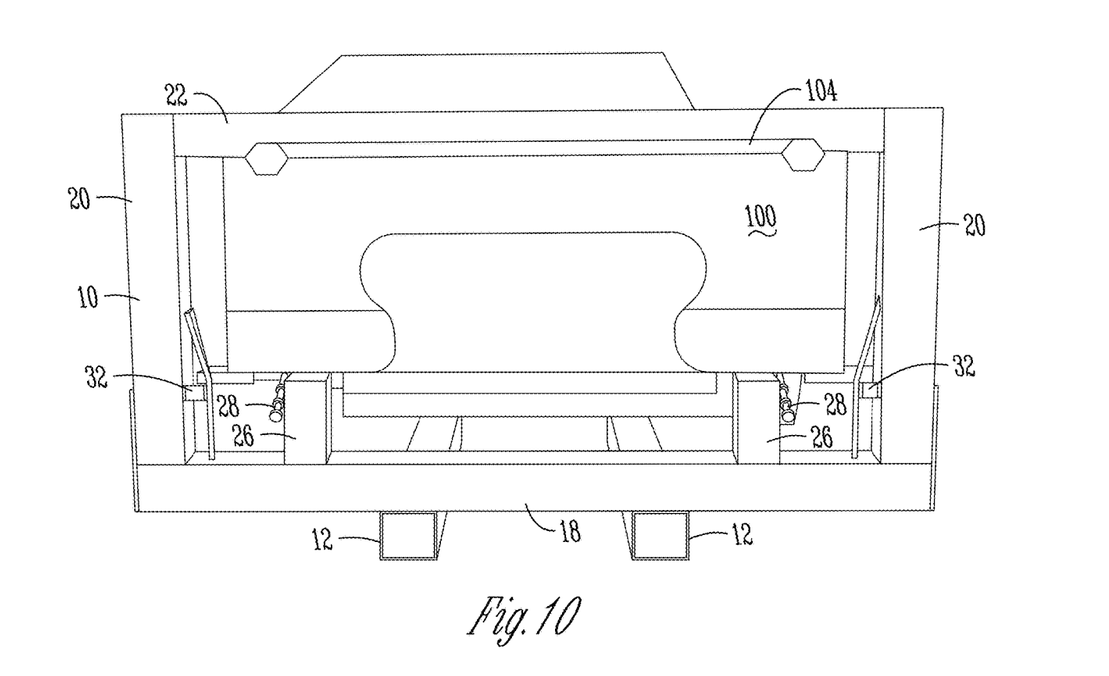
FIG. 10 is a front elevation of a feeder house supported on a support stand.
Figure 11:
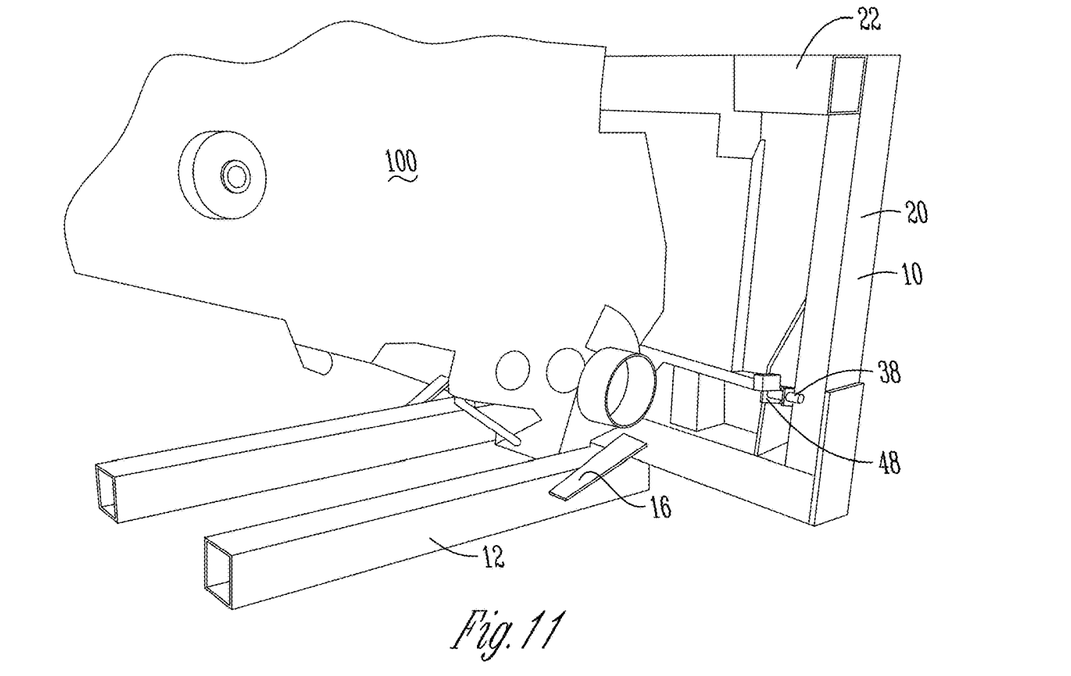
FIG. 11 is a perspective view of the feeder house and support stand of FIG. 10.

With the stand 10 thus secured to the feeder house 100, the forklift 200 can raise the stand 10 slightly to take the weight of the feeder house 100 off the combine. The feeder house 100 can then be unattached from the combine in a conventional manner leaving the combination of the feeder house 100 and the stand 10 supported by the forklift 200. The forklift 200 can then be used to pull the feeder house 100 free from the combine and move the combination of the stand 10 and feeder house 100 as shown in FIG. 9. FIGS. 10-13 show the feeder house 100 supported by the stand 10, after the forklift 200 has moved the combination to a desired location and lowered it onto the ground or floor. With the feeder house 10 supported by the stand as shown in FIGS. 8-11 a user can safely work on the feeder house 10. A forklift 200 can then be used to move the combination to a storage location, or back to the combine to reattach the feeder house to the combine.

According to an alternative not shown, locking caster wheels could be provided on the bottom of the base to permit easy manipulation and movement of the stand 10 when not loaded on a forklift.

The present invention contemplates numerous variations, options and alternatives, and is not to be limited to the specific embodiments described herein. Other changes are considered to be part of the present invention.

What is claimed is:

1. A stand supporting a feeder house, the stand comprising:
   a base, the base having a flat lower surface, the base being adapted to receive a lifting mechanism;
   an upright frame mounted at an end of the base, the upright frame having an upper horizontal member in engagement with a flange on the feeder house and at least one lower limit member located below the upper horizontal member bearing against the feeder house such that the feeder house is attached to the upright frame in a cantilever manner between the upper horizontal member and the at least one lower limit member;
   whereby the lifting mechanism can move the feeder house attached to the upright frame to a desired location and lower the base until its flat lower surface rests on a support surface such as a floor or the ground and further whereby with the lower surface resting on the support surface the stand supports the attached feeder house in a secure configuration above the ground.

2. The stand of claim 1, further comprising a latching member supported by the upright frame and positioned to be engaged by a latching hook on the feeder house.

3. The stand according to claim 2, further comprising a U-bracket attached to the upright frame, and wherein the U-bracket supports the latching member.

4. The stand according to claim 3, wherein the latching member is a bolt received in the U-bracket.

5. The stand of claim 1, wherein the base comprises a pair of elongated tubes spaced apart from and parallel to each other.

6. The stand of claim 5, wherein the elongated tubes are square steel tubes.

7. The stand of claim 1, wherein the upright frame comprises the upper horizontal member, a lower horizontal member and a pair of upright members that connect the upper horizontal member to the lower horizontal member.

8. The stand of claim 7, wherein the lower horizontal member is affixed to the base.

9. The stand of claim 7, further comprising a pair of upright posts that extend upwardly from the lower horizontal member, at least one threaded connector being mounted to each of the upright posts, and wherein the limit members are each received within at least one of threaded connectors, whereby the limit members are adjustable relative to the upright posts.

* * * * *